United States Patent [19]

Illg

[11] 4,422,227
[45] Dec. 27, 1983

[54] ROLLER ASSEMBLY
[75] Inventor: Peter Illg, Schlaitdorf, Fed. Rep. of Germany
[73] Assignee: SKF Kugellagerfabriken GmbH, Schweinfurt, Fed. Rep. of Germany
[21] Appl. No.: 213,847
[22] Filed: Dec. 8, 1980
[30] Foreign Application Priority Data
Dec. 18, 1979 [DE] Fed. Rep. of Germany ....... 2950841
[51] Int. Cl.³ ............................................ B21B 31/02
[52] U.S. Cl. ................................. 29/116 R; 308/191
[58] Field of Search ............ 29/116 R; 308/190, 191, 308/236

[56] References Cited
U.S. PATENT DOCUMENTS
3,171,697 3/1965 Nicolaides ..................... 308/190 X
3,469,892 9/1969 Langstroth ..................... 308/190 X
4,026,610 5/1977 Neder et al. ........................ 308/236

FOREIGN PATENT DOCUMENTS
464423 4/1937 United Kingdom ............... 308/190

Primary Examiner—Eugene F. Desmond
Attorney, Agent, or Firm—Eugene E. Renz, Jr.

[57] ABSTRACT

A tension roller assembly adapted to be mounted on a holder having an opening comprising a guide bolt at one axial end abutting against a front face of the holder and having an axial bore, a fastening element separate from the guide bolt having a radially projecting collar for abutting the rear face of the holder and a projection engaging through the opening in the holder and protruding into the bore of the guide bolt and fixed therein.

2 Claims, 6 Drawing Figures

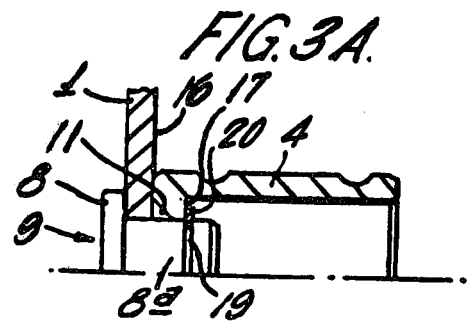
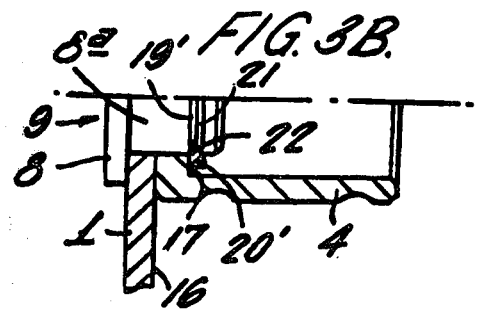

ROLLER ASSEMBLY

BACKGROUND OF THE INVENTION

The present invention relates to rollers particularly tension rollers and to an assembly incorporating such a roller including a so-called guide bolt which is secured to a holder or the like for use as assemblies for tensioning belts for cam shafts, V-belts or the like.

Roller bearings for drawer guides and the like attached to a holder or carrier are known in which the guide bolt is provided with a plug which is secured through an opening in the holder or carrier. The roller itself is mounted and held via a slide bearing. An assembly of this type is shown in West German Design Pat. No. 7,603,166.

Another prior art design in this general field is that shown in West German Design Pat. No. 7,412,059. In accordance with this design, the tension roller and sheet metal holder assembly comprise a roller body formed by metal working mounted on the outer race of an anti-friction bearing and a guide bolt which carries the inner raceways for the rollers inserted between it and the outer race. In this tension roller, the guide bolt has an offset section at one end formed integrally therewith which section extends through an opening in the sheet metal holder and is flanged at the free end for fastening the guide bolt and thus the tension roller to the sheet metal holder.

These known designs have a number of disadvantages and drawbacks. For example, they are comparatively bulky and heavy thereby necessitating relatively high material requirements. In addition, fastening of these known designs is not as secure and rigid as that of the present invention. Furthermore, it has been found that during the operation of these tension rollers, the belt pull on the tension roller and the torque thus generated causes the fastener to loosen and become detached due to buckling of the sheet metal holder whereby the tension roller assumes a skewed position relative to the sheet metal holder. It has also been found that special measures must be taken during the manufacturing of these tension rollers by reason of the fact that the offset fastening section of the guide bolt which must be shaped after the assembly of the roller with the holder or of the tension roller with the sheet metal holder must at the same time not be hardened. During shaping of the fastening section of the guide bolt, there is also a risk that the sheet metal holder will also be deformed whereby the accuracy, that is, the exact vertical orientation of the guide bolt relative to the sheet metal holder, is impaired.

It is, therefore, an object of the present invention to provide a tension roller assembly fastened to a holder made, for example, of sheet metal, which can be manufactured more simply and precisely, has a reduced weight and above all provides a good and permanently sure and stable connection of the components.

To this end, the tension roller assembly of the present invention comprises a guide bolt connected to a holder by riveting wherein the guide bolt is a hollow cylindrical member with an axial bore and is supported with one axial end against the front end of the sheet metal holder. The tension roller assembly further includes a fastening element separate from the guide bolt which has a radially projecting collar or the like abutting the front end of the sheet metal holder facing the guide bolt and a projection passing through the bore of the sheet metal holder and protruding into the bore of the guide bolt which projection is fixed in the bore of the guide bolt. This arrangement provides several advantages. For example, since the guide bolt is in the form of a hollow cylindrical member, it requires a relatively small amount of material and is of comparatively light weight. By this construction, it is possible to manufacture the guide bolt from a pipe section or the like. Additionally, since the fastening element is separate from the guide bolt, the guide bolt can be heat treated as a unit if necessary without having to exercise special measures to cover certain sections. The radially projecting collar of the separate fastening element with its relatively large diameter provides in turn a large contact surface on the sheet metal holder thus guaranteeing a good clamping action of the sheet metal holder between the front end of the guide bolt and the front end of the collar without deformation of the components, especially of the sheet metal holder to fasten the elements in this clamping zone. This collar, therefore, stiffens the fastening element and provides a rigid securely mounted fastening arrangement. It is also possible to produce a relatively long clamping zone; i.e., one in which there is overlap of the fastening element with the sheet metal holder and with the guide bolt which, in turn, results in a most favorable torque transmission.

There are various arrangements for securing the fastening element in the bore of the guide bolt. For example, it is possible to roll the free end of the fastening element into an annular slot in the bore of the guide bolt or to flange it behind the collar with good tension which is achievable by rolling and flanging of the individual components. Other possibilities include flexing of a clamping or expanding ring provided with claws or teeth into the surface of the projection of the fastening element or the insertion of a circlip into the annular slot on the peripheral surface of the fastening element so the clamping rings, expanding rings and circlips abut the collar of the guide bolt. In order to achieve a good tensioning of the individual components, it is desirable in the latter case to provide at least one of the axially inner lateral surfaces of the annular slot and of the circlip with lateral surfaces facing away from the collar which are inclined or wedge shaped so the expanding ring tensioning radially inwardly is pressed in the axial direction against the collar of the guide bolt thereby pressing the components against each other. Furthermore, it is possible to provide the bore of the guide bolt and the periphery of the projection of the fastening element each with cooperating thread sections. Thus, by screwing the fastening element into the tap hole of the guide bolt, the guide bolt and sheet metal holder are tensioned against one another.

In accordance with one of the illustrated embodiments, a ring-shaped axially projecting centering surface is provided in the sheet metal holder in the zone of the bore which centers the guide bolt on the sheet metal holder and the guide bolt in turn has a matching annular recess on the axial end thereof turned toward the sheet metal holder. By this arrangement, there is the additional advantage that the radial and shearing forces which act on the rollers and thus on the guide bolts are transmitted directly to the sheet metal holder without loading the fastening element.

Another feature is providing a centric bore in the tension roller which further contributes to overall weight reduction of the assembly.

The present invention has application to rollers with friction bearings and with anti-friction bearings as well. Rollers with anti-friction bearings in particular are suitable for high performance requirements and in accordance with one of the embodiments the inner raceways for the rollers are formed directly in the guide bolt and the outer race directly forms the roller body. This arrangement provides particular manufacturing advantages.

DESCRIPTION OF THE DRAWINGS

These and other objects of the present invention and the various details of the operation and construction thereof are hereinafter more fully set forth with reference to the accompanying drawings, wherein:

FIG. 3a is an enlarged transverse sectional view of the upper half of FIG. 3; and FIG. 3b is an enlarged transverse sectional view showing the lower half of FIG. 3.

DESCRIPTION OF THE PREFERRED EMBODIMENTS

Figure 1:
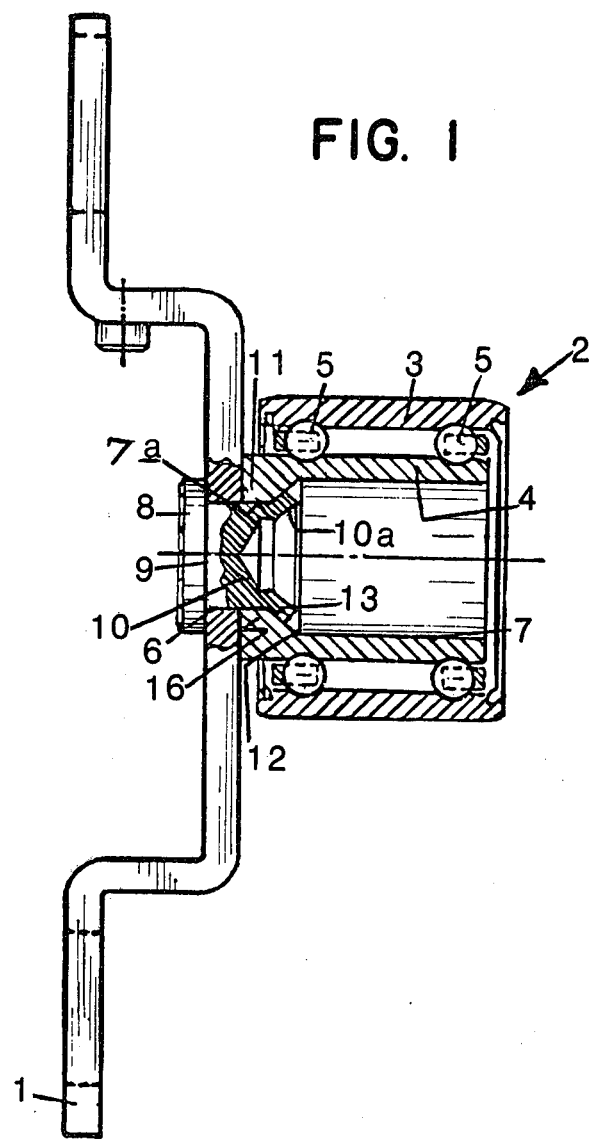
FIG. 1 is a sectional view of a tension roller assembly in accordance with the present invention with an anti-friction bearing fastened to a sheet metal holder.

Referring now to the drawings and particularly to FIG. 1 thereof, there is illustrated an assembly including a holder 1, for example, made of sheet metal and a tension roller in accordance with the present invention generally designated by the numeral 2 mounted on the holder. These assemblies are typically used in vehicle motors to tension, for example, the toothed belts for the cam shaft drive, V-belts or the like. To this end, the holder 1 is usually mounted so it pivots on a bolt and has an arc-shaped oblong hole to receive a set screw so the holder may be pivoted through an arc and secured in a desired position to tension a belt or the like. In other instances, the holder is provided with two elongated oblong slots which are parallel to one another so the holder can be shifted in a parallel direction again to tension a drive or V-belt and suitable screw fasteners engage through the oblong elongated slots to secure the holder in a predetermined position.

As illustrated the tension roller 2 comprises an annular roller body 3 which forms the outer race of an anti-friction bearing and a so-called annular guide bolt member 4 forming the inner raceway of the bearing, in the present instance, two rows of balls 5 in the annular space between the roller body member 3 and guide bolt member 4. The holder 1 is provided with an opening or hole 6 and the guide bolt member 4 is provided with an axial bore 7 which at one end narrows to a smaller bore opening 7a of approximately the size and shape of the opening in the holder 1 to receive a fastening member 9 to secure the assembly in place on the holder. The fastening element 9 has a collar or head portion 8 which bottoms against one face of the holder 1 in the manner illustrated in FIG. 1 and a projection 10 which engages through the opening 6 in the holder and into the bore 7a of the guide bolt. The inner axial end of the guide bolt 4 confronting the holder is formed with an annular radially inwardly directed collar 11 forming the bore portion 7a and conical section 12. As illustrated, the conical section 12 converges outwardly from the small diameter portion 7a of the bore. The outer terminal end of the projection 10 of the fastening element is outwardly flared as at 10a to confront and snugly contact the conical surface 12 and thereby firmly secure the tension roller assembly in place. The flanged free end 13 of the fastening element presses the collar 11 of the guide bolt and the sheet metal holder against the collar 8 of the fastening element so the guide bolt and the holder are tensioned against each other.

As noted above, in accordance with the present invention there is no deformation of the sheet metal holder 1 or the guide bolt 4 since both parts can be formed and finished completely before assembly. Thus it is unnecessary to leave parts of the guide bolt 4 unhardened and instead the guide bolt 4 can be heat treated completely which thereby simplifies and reduces the cost of its manufacture. It is noted that only the fastening element which is a relatively simple item to manufacture is deformed to lock the parts in place. Note that the inner axial end face of the guide bolt 4 and the holder surrounding the opening abut one another to provide surface-to-surface contact and resist torque and bending applied.

Figure 2:
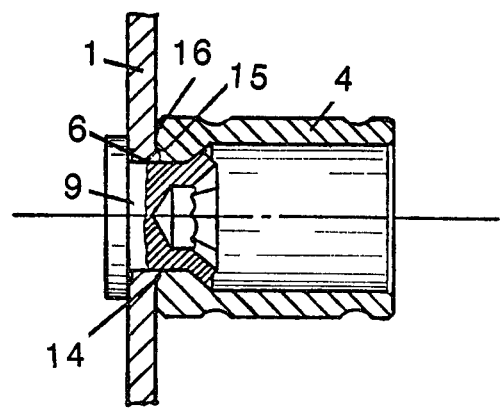
FIGS. 2-4 are transverse sectional views showing modified versions of the assembly illustrated in FIG. 1.

There is illustrated in FIG. 2 a modified tension roller assembly in accordance with the present invention wherein similar parts of the assembly are designated by the same reference numeral as in the FIG. 1 embodiment. In this instance, the sheet metal holder 1 is provided with an annular, axially projecting centering flange 14 and the inner axial end face of the guide bolt 4 is provided with a complementary ring-shaped recess 15 within which the flange 14 nests. In this manner the radial position of the guide bolt 14 is fixed relative to the sheet metal holder 1 so the opening 6 in the sheet metal holder aligns precisely with the opening 7a in the guide bolt for ease of assembly of the fastening element 9.

Figure 3:
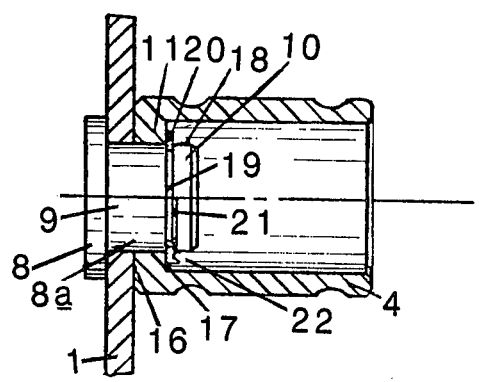

Further modifications of the assembly of the present invention are illustrated in FIG. 3. Again, similar parts are designated by the same reference numerals as in the previously described embodiments. In the present instance, the inwardly projecting annular collar 11 defining the bore 7a of the guide bolt 4 has an annular face 17 parallel to the axial end face 16. The fastening element has a shank portion 8a of circular cross section smaller than the head 8 and is provided with a circumferentially extending slot 19 spaced inwardly from the inner terminal end of the shank portion 8a. This slot is adapted to receive a circlip 20 which projects beyond the slot to contact the annular face 17 of the collar 11 to secure the parts in place. In this manner the guide bolt 4 is pressed against the sheet metal holder 1 and against the head 8 of the fastening element 9 by the circlip 20.

In order to achieve a contact pressure, it is useful as shown in the lower part of FIG. 3 to form the slot with a lateral conical surface 22 and provide the circlip with an inclined lateral surface 22 to press the radially expanding ring 20 against the inner front end 17 of the collar 11.

Figure 4:
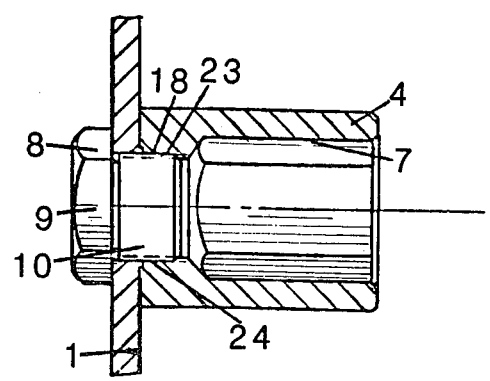

There is illustrated in FIG. 4 a further modification in accordance with the present invention where again similar parts are designated with the same reference numeral. In accordance with this embodiment, the shank section 10a of the fastening element 9 is threaded and the reduced bore section 7a of the guide bolt is provided with complementary threads. Further, instead of the internal circumferential surface of the guide bolt 4 being cylindrical as in the previous embodiments, the internal surface 7 is of polyhedral cross section to accommodate a tool for turning the guide bolt and tightening it firmly in place against the sheet metal holder in a tensioned condition.

While various embodiments of the present invention have been illustrated and described herein, it is not intended to limit the invention and changes and modifications may be made within the scope of the claims attached hereto. For example, it is possible to design the guide bolt 4 as the journal of a sliding bearing on which the roller bodies 3 slide directly. Additionally, instead of the circlip 20 utilized in the embodiment according to FIG. 3, a clamping or expanding ring provided with claws can be pressed directly into the shank portion of the fastening element which projects beyond the annular collar 11 to secure the parts in place. Additionally, the present invention is not limited to a so-called tension roller but it also has application to other rollers provided with guide bolts; e.g. rollers for extracting rails, drawers, roller pins, bearing rollers, idler rollers for conveyors, etc. Furthermore, the outer race of the bearing can serve directly as a roller body. It is, however, also possible to place a separately manufactured roller body made of sheet metal or plastic over this outer race. Moreover, instead of the sheet metal holder, it is possible to use a different type of holder which is, for example, forged, cast or manufactured by another method. Furthermore, while the holder has been illustrated as of a given shape, it is clearly possible within the scope of the invention to utilize holders of different shapes.

What is claimed is:

1. A tension roller assembly adapted to be mounted on a holder having an opening therein comprising an elongated guide bolt member having an axial bore therethrough, a radially inwardly directed annular collar of small axial extension at one end of said guide bolt member adjacent the face thereof abutting a front face of the holder, said collar forming an opening of essentially the same size as said opening in said holder and smaller than the remainder of said axial bore, a fastening member having an enlarged head portion abutting the rear face of the holder and a shank portion engaging through said opening in the holder and having abutment means for securing it to said guide bolt member adjacent said annular collar and a roller body member circumscribing and radially spaced from the guide bolt member, said abutment means comprising an expanding ring engageable in an annular slot on the generatrix of the fastening member and confronting said annular collar and a plurality of rolling elements in the annular space between the roller body member and the guide bolt member which engage in raceways formed in said confronting surfaces, said collar being located outside the zone of the race ways for the rolling elements.

2. A roller as claimed in claim 1 wherein at least one of the axially inner lateral surfaces of the annular slot and the expanding ring are inclined, said expanding ring lateral surfaces facing away from said collar.

* * * * *